(12) United States Patent
Cheng

(10) Patent No.: US 11,494,014 B2
(45) Date of Patent: Nov. 8, 2022

(54) TOUCH PANEL, TOUCH DISPLAY DEVICE, AND FABRICATION METHOD THEREOF

(71) Applicant: HUIZHOU CHINA STAR OPTOELECTRONICS TECHNOLOGY CO., Guangdong (CN)

(72) Inventor: Chingyuan Cheng, Guangdong (CN)

(73) Assignee: HUIZHOU CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 142 days.

(21) Appl. No.: 17/051,478

(22) PCT Filed: Jul. 9, 2020

(86) PCT No.: PCT/CN2020/101108
§ 371 (c)(1),
(2) Date: Oct. 29, 2020

(87) PCT Pub. No.: WO2021/248610
PCT Pub. Date: Dec. 16, 2021

(65) Prior Publication Data
US 2022/0187936 A1   Jun. 16, 2022

(30) Foreign Application Priority Data
Jun. 12, 2020 (CN) .......................... 202010537386.5

(51) Int. Cl.
*G06F 3/041* (2006.01)
*G02F 1/1333* (2006.01)
*G02F 1/1339* (2006.01)

(52) U.S. Cl.
CPC .......... *G06F 3/0412* (2013.01); *G02F 1/1339* (2013.01); *G02F 1/13338* (2013.01); *G06F 2203/04103* (2013.01)

(58) Field of Classification Search
CPC ......... G06F 3/0412; G06F 2203/04103; G02F 1/13338; G02F 1/1339
See application file for complete search history.

(56) References Cited

U.S. PATENT DOCUMENTS

2017/0276986 A1* 9/2017 Chen ................. G02F 1/133528
2020/0041832 A1* 2/2020 Hsu ................... G02F 1/133308

FOREIGN PATENT DOCUMENTS

| CN | 102999201 A | 3/2013 |
|---|---|---|
| CN | 104570469 A | 4/2015 |
| CN | 205899447 U | 1/2017 |
| CN | 110413154 A | 11/2019 |
| CN | 110837315 A | 2/2020 |
| CN | 111766977 A | 10/2020 |
| JP | 2017090812 A | 5/2017 |

* cited by examiner

*Primary Examiner* — Afroza Chowdhury
(74) *Attorney, Agent, or Firm* — Mark M. Friedman

(57) ABSTRACT

The present application provides a touch panel, a touch display device, and a fabrication method thereof. The touch panel includes an encapsulation cover and a touch substrate disposed oppositely; and a first sealant disposed between the encapsulation cover and the touch substrate, wherein the encapsulation cover, the touch substrate, and the first sealant are enclosed to form a first cavity, and the first cavity is filled with a transparent filling layer.

9 Claims, 4 Drawing Sheets

TOUCH PANEL, TOUCH DISPLAY DEVICE, AND FABRICATION METHOD THEREOF

FIELD OF INVENTION

The present application relates to a field of display technology, and more particularly to a touch panel, a touch display device, and a fabrication method thereof.

BACKGROUND

With development of display technology, large-size curved touch displays have become a focus of attention in the industry. At present, touch screens are mainly composed of a display panel and a touch panel with a protective cover. Due to limitation of physical reinforcement, the protective cover has a thickness of at least greater than 3.0 mm, which is far greater than a thickness of display panels such as liquid crystal panels. In addition to the protective cover, the touch panel also comprises a touch substrate and an optical adhesive layer for bonding the protective cover and the touch substrate, so that a thickness difference between the display panel and the touch panel is increased. When the display panel and the touch panel are vacuum frame-laminated, the display panel with a thinner thickness will bend and deform toward the touch substrate. In addition, bending of the touch panel will be limited due to an optical glue on an entire surface between the protective cover and the touch substrate.

At present, touch screens are mainly composed of a display panel and a touch panel with a protective cover. Due to limitation of physical reinforcement, the protective cover has a thickness of at least greater than 3.0 mm, which is far greater than a thickness of display panels such as liquid crystal panels. In addition to the protective cover, the touch panel also comprises a touch substrate and an optical adhesive layer for bonding the protective cover and the touch substrate, so that a thickness difference between the display panel and the touch panel is increased. When the display panel and the touch panel are vacuum frame-laminated, the display panel with a thinner thickness will bend and deform toward the touch substrate. In addition, bending of the touch panel will be limited due to an optical glue on an entire surface between the protective cover and the touch substrate.

The present application provides a touch panel, a touch display device and a manufacturing method thereof, so as to solve the problems such as the display panel with a thinner thickness will bend and deform toward the touch substrate when the display panel and the touch panel are vacuum frame-laminated, and bending of the touch panel which is limited due to an optical glue on an entire surface between the protective cover and the touch substrate.

To solve the above problems, technical solutions provided by the present application are described as follows:

The present application provides a touch panel, comprising an encapsulation cover and a touch substrate disposed oppositely; and a first sealant disposed between the encapsulation cover and the touch substrate, wherein the encapsulation cover, the touch substrate and the first sealant are enclosed to form a first cavity, and the first cavity is filled with a transparent filling layer.

In the touch panel of the present application, a material of the transparent filling layer is liquid crystal.

In the touch panel of the present application, a black dam is disposed on a side of the encapsulation cover close to the touch substrate, and an orthographic projection of the black dam on the touch substrate covers an orthographic projection of the first sealant on the touch substrate.

The present application further provides a touch display device, comprising: a display panel and the touch panel according to the previous embodiment; and a second sealant disposed between the display panel and the touch panel, wherein the display panel, the touch panel and the second sealant are enclosed to form a second cavity, and an air pressure in the second cavity is lower than an atmospheric pressure outside the second cavity.

In the touch display device of the present application, a material of the transparent filling layer is liquid crystal.

In the touch display device of the present application, a black dam is disposed on a side of the encapsulation cover close to the touch substrate, and an orthographic projection of the black dam on the touch substrate covers an orthographic projection of the first sealant on the touch substrate.

In the touch display device of the present application, a thickness of the touch panel is equal to a thickness of the display panel.

In the touch display device of the present application, the display panel comprises a display area and a non-display area surrounding the display area, and the black dam is located in the non-display area.

In the touch display device of the present application, the display panel comprises a first substrate and a second substrate disposed opposite to each other, and a third sealant is disposed between the first substrate and the second substrate; the first substrate, the second substrate and the third sealant are enclosed to form a third cavity, and the third cavity is filled with a liquid crystal layer; and the first substrate comprises a base substrate and a thin film transistor layer on the base substrate, and a thickness of the base substrate is equal to a thickness of the encapsulation cover.

In the touch display device of the present application, the display panel is curved to form an arc-shaped curved surface structure, and the touch panel is disposed on a concave side of the arc-shaped display panel and conforms with the shape of the touch panel.

The present application further provides a fabrication method of a touch display device, comprising following steps: providing a touch panel and a display panel, wherein providing the touch panel comprises: providing an encapsulation cover and a touch substrate; and forming a first sealant between the encapsulation cover and the touch substrate, wherein the encapsulation cover and the touch substrate are aligned so that the encapsulation cover, the touch substrate and the first sealant are enclosed to form a first cavity, and the first cavity is filled with a transparent filling layer;

forming a second sealant between the touch panel and the display panel, wherein the touch panel and the display panel are aligned so that the display panel, the touch panel, and the second sealant are enclosed to form a second cavity; and/reducing an air pressure in the second cavity so that the air pressure in the second cavity is lower than an atmospheric pressure outside the second cavity.

In the fabrication method of the touch display device of the present application, further comprising bending the touch panel and the display panel so that the display panel is bent into an arc-shaped curved surface structure, and the touch panel is disposed on a concave side of the arc-shaped display panel and conforms with the shape of the touch panel.

Beneficial effects of the present application are that an encapsulation cover and a touch substrate of the present application are oppositely provided and adhered together through a first sealant, and a first cavity formed by surrounding of the encapsulation cover, the touch substrate, and the first sealant is filled with a transparent filling layer, so that the touch panel forms a box structure similar to the display panel, thereby solving problems of bending and deformation of the display panel toward the touch substrate due to use of an optical glue formed on an entire surface. At the same time, the touch panel of the box structure may also greatly reduce a thickness of the touch panel and prevents deformation due to over bending of the display panel toward the touch panel during the vacuum frame-lamination.

BRIEF DESCRIPTION OF DRAWINGS

To detailly explain the technical schemes of the embodiments or existing techniques, drawings that are used to illustrate the embodiments or existing techniques are provided. Apparently, the illustrated embodiments are just a part of those of the present disclosure. It is easy for any person having ordinary skill in the art to obtain other drawings without labor for inventiveness.

DETAILED DESCRIPTION

Figure 1:
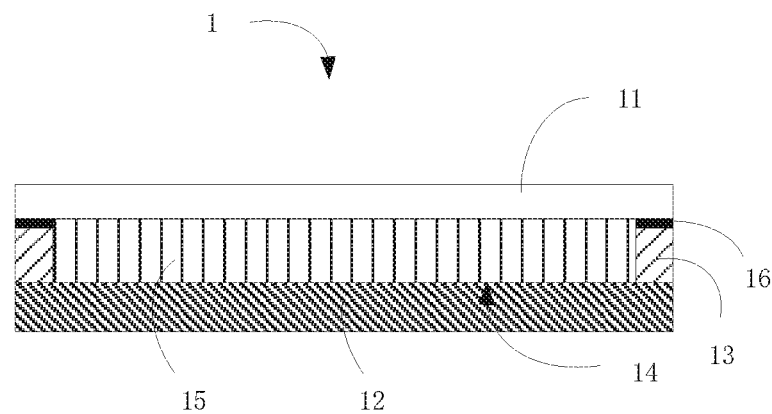
FIG. 1 is a structural schematic diagram of a touch panel in an embodiment of the present application.

The description of the following embodiments refers to the attached drawings to illustrate specific embodiments in which the present invention can be implemented. The directional terms mentioned in the present invention, such as up, down, front, back, left, right, inner, outer, side, etc., are for reference only for the direction of the additional schema. Therefore, the directional terms used are used to describe and understand the present invention, rather than to limit the present invention. In the figure, units with similar structures are indicated by the same reference numerals.

In the description of the present application, it should be understood that the terms "portrait", "lateral", "length", "width", "upper", "lower", "front", "rear", "left", "right", "vertical", "horizontal", "top", "bottom", "inner", "outer", "clockwise", "counterclockwise" etc. indicated orientation or positional relationship is based on the orientation or positional relationship shown in the drawings, only to facilitate the description of the present application and simplify the description, not to indicate or imply the device referred to Or the element must have a specific orientation, be constructed and operated in a specific orientation, and therefore cannot be understood as a limitation of the present application. In addition, the terms "first" and "second" are used for descriptive purposes only, and cannot be understood as indicating or implying relative importance or implicitly indicating the number of technical features indicated. Thus, the features defined as "first" and "second" may explicitly or implicitly include one or more of the features. In the description of the present application, the meaning of "a plurality of" is two or more, unless otherwise specifically limited.

In the description of the present application, it should be noted that, unless otherwise clearly specified and limited, the terms "installation", "connection", and "connection" should be understood in a broad sense, for example, it can be fixed connection or detachable Connected, or integrally connected; it can be mechanical, electrical, or can communicate with each other; it can be directly connected, or it can be indirectly connected through an intermediary, it can be the connection between two elements or the interaction of two elements relationship. Those of ordinary skill in the art can understand the specific meanings of the above terms in the present application according to specific situations.

In the present application, unless otherwise clearly specified and defined, the first feature "above" or "below" the second feature may include the direct contact of the first and second features, or may include the first and second features Not direct contact but contact through another feature between them. Moreover, the first feature is "over", "above" and "on the top of" the second feature includes that the first feature is directly above and obliquely above the second feature, or simply means that the first feature is higher in level than the second feature. The first feature is "below", "lower", and "on the bottom of" the second feature includes that the first feature is directly below and obliquely below the second feature, or simply means that the first feature is less horizontal than the second feature.

The following disclosure provides many different embodiments or examples for implementing different structures of the present application. In order to simplify the disclosure of the present application, the components and settings of specific examples are described below. Of course, they are only examples, and the purpose is not to limit the present application. In addition, the present application may repeat reference numerals and/or reference letters in different examples. Such repetition is for the purpose of simplicity and clarity, and does not itself indicate the relationship between the various embodiments and/or settings discussed. In addition, the present application provides examples of various specific processes and materials, but those of ordinary skill in the art may be aware of the application of other processes and/or the use of other materials.

Technical solutions of the present application will now be described in conjunction with specific embodiments.

The present application provides a touch panel 1, as shown in FIG. 1, comprising an encapsulation cover 11 and a touch substrate 12 disposed oppositely, and a first sealant 13 is provided between the encapsulation cover 11 and the touch substrate 12. The encapsulation cover 11, the touch substrate 12, and the first sealant 13 are combined to form a first cavity 14, and the first cavity 14 is filled with a transparent filling layer 15.

It is noted that the existing touch screen is mainly composed of a display panel and a touch panel with a protective cover. Due to limitation of physical reinforcement, the protective cover has a thickness of at least greater than 3.0 mm, which is far greater than a thickness of display panels such as liquid crystal panels. In addition to the protective cover, the touch panel also comprises a touch substrate and an optical adhesive layer for bonding the protective cover and the touch substrate, so that a thickness difference between the display panel and the touch panel is increased. When the display panel and the touch panel are vacuum frame-laminated, the display panel with a thinner thickness will bend and deform toward the touch substrate. In addition, bending of the touch panel will be limited due to an optical glue on an entire surface between the protective cover and the touch substrate. In the present application, an encapsulation cover 11 and a touch substrate 12 are oppositely provided and adhered together through a first sealant 13, and a first cavity 14 formed by surrounding of the encapsulation cover 11, the touch substrate 12, and the first sealant 13 is filled with a transparent filling layer 15, so that the touch panel 1 forms a box structure similar to the display panel, thereby solving problems of bending and deformation of the touch panel 1 toward the touch substrate due to use of an optical glue formed on an entire surface. At the same time, the touch panel 1 of the box structure may also greatly reduce a thickness of the touch panel and prevents deformation due to over bending of the display panel toward the touch panel 12 during the vacuum frame-lamination.

Accordingly, in the present embodiment, a thickness of the encapsulation cover 11 in the touch panel 1 with the box structure can be substantially less than that of the existing protective cover with a thickness of at least greater than 3.0 mm. The thickness of the encapsulation cover 11 may be less than 0.5 mm, and the touch substrate 12 may comprise a touch substrate and a touch layer disposed on the touch substrate. The encapsulation cover 11 may use a glass substrate with the same substrate material and thickness as that of the touch substrate. Specifically, the encapsulation cover 11 may be a glass substrate with a thickness of 0.4 mm. Obviously, this type of glass substrate material is more common in the application of substrates on both sides of a display panel, which makes it more convenient to obtain materials for the production of the touch panel 1 and realize mass production at a lower cost.

In one embodiment, a material of the transparent filling layer 15 is, for example, transparent resin, liquid crystals, and other materials, and is not limited on the basis of being transparent. Specifically, in the present embodiment, the material of the transparent filling layer 15 is liquid crystals. Obviously, liquid crystal materials are more common in the application of liquid crystal display panels, which makes them easier to obtain for the production of touch panels 1 and realize mass production at a lower cost. In addition, liquid crystals adopted as the material of the transparent filling layer 15 also facilitate bending of the touch panel 1.

In an embodiment, as shown in FIG. 1, a black dam 16 is provided on a side of the encapsulation cover 11 close to the touch substrate 12, and an orthographic projection of the black dam 16 on the touch substrate 12 covers an orthographic projection of the first sealant 13 on the touch substrate 12. That is, the black dam 16 is disposed along a periphery of the encapsulation cover 11 near one side of the touch substrate 12 to entirely cover the first sealant 13. After the touch panel 1 is specifically combined with a display panel, it is also convenient for the black dam 16 to block light in the peripheral area of the touch panel 1.

Figure 2:
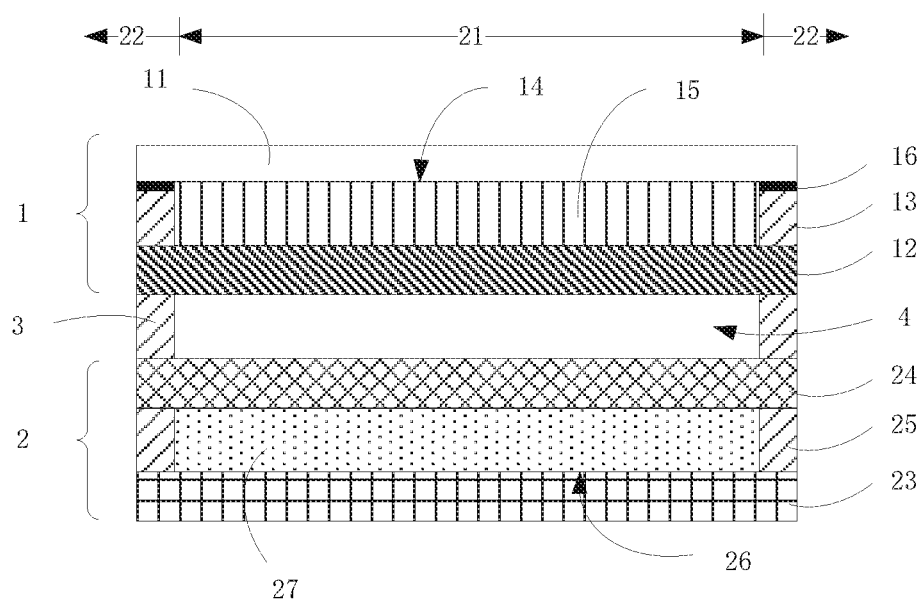
FIG. 2 is a first structural schematic diagram of a touch display device in an embodiment of the present application.

The present application also provides a touch display device, as shown in FIG. 2, comprising a display panel 2 and the touch panel 1 as described in the previous embodiment. A second sealant 3 is disposed between the display panel 2 and the touch panel 1, and the display panel 2, the touch panel 1, and the second sealant 3 are enclosed to form a second cavity 4. An air pressure in the second cavity 4 is lower than that an atmospheric pressure outside the second cavity 4.

It is noted that the second sealant 3 is disposed between the display panel 2 and the touch panel 1, and the display panel 2, the touch panel 1 and the second sealant 3 are enclosed to form the second cavity 4. The display panel 2 and the touch panel 1 are also formed as a box structure, and the air pressure in the second cavity 4 enclosed by the display panel 2, the touch panel 1 and the second sealant 3 is lower than the air pressure outside the second cavity 4, so as to tightly combine the display panel 2 and the touch panel 1 by using the pressure of the atmospheric pressure since the air pressure in the second cavity 4 is lower than the atmospheric pressure outside the second cavity 4 on the basis of adhering the display panel 2 and the touch panel 1 with the second sealant 3. Specifically, the second cavity 4 between the display panel 2 and the touch panel 1 is in a vacuum state, that is, the display panel 2 and the touch panel 1 are tightly combined by a vacuum frame-lamination to ensure that the display panel 2 and the touch panel 1 is not easy to separate after subsequent use or being bent into a curved display screen.

Accordingly, in the present embodiment, before the display panel 2 and the touch panel 1 are bent, a distance between the display panel 2 and the touch panel 1 can be adjusted according to actual needs. Obviously, under the condition that the second cavity 4 between the display panel 2 and the touch panel 1 is in a vacuum state, the display panel 2 and the touch panel 1 will have slight curved deformation toward the second cavity 4. When the distance between the display panel 2 and the touch panel 1 is too short, the display panel 2 and the touch panel 1 will bend toward the second cavity 4 and then contact each other, and when the distance between the display panel 2 and the touch panel 1 is too long, the space of the second cavity 4 will be too large, thereby increasing a process difficulty of the vacuum frame-lamination of the display panel 2 and the touch panel 1 and also an overall thickness of the touch display device. Specifically, in the present embodiment, the distance between the display panel 2 and the touch panel 1 is set to 5 μm.

In one embodiment, a difference between the thickness of the touch panel 1 and the thickness of the display panel 2 is obviously as small as possible. It can be understood that a difference between the thickness of the touch panel 1 and the thickness of the display panel 2 is obviously as small as possible when performing the vacuum frame-lamination of the touch panel 1 and the display panel 2 since all the forces applied to the touch panel 1 and the display panel 2 disposed oppositely are more uniform, thereby preventing, for example, the display panel 2 being excessively bent and deformed toward the touch panel 1 when the thickness of the touch panel 1 is much greater than the thickness of the display panel 2. Specifically, the thickness of the touch panel 1 and the thickness of the display panel 2 are equal.

In one embodiment, as shown in FIG. 2, the display panel 2 comprises a display area 21 and a non-display area 22 surrounding the display area 21, and the black dam 16 is located in the non-display area 22. It is understood that under the condition that the black dam 16 is located in the non-display area 22, the orthographic projection of the black dam 16 on the touch substrate 12 covers the orthographic projection of the first sealant 13 on the touch substrate 12, and an area of the black dam 16 can be equal to an area of the first sealant 13. Of course, the area of the black dam 16 can also be larger than the area of the first sealant 13, which is convenient to improve an accuracy for aligning it with the first sealant 13.

In one embodiment, as shown in FIG. 2, the display panel 2 comprises a first substrate 23 and a second substrate 24 disposed opposite to each other, and a third sealant 25 is provided between the first substrate 23 and the second substrate 24. The first substrate 23, the second substrate 24, and the third sealant 25 are enclosed to form a third cavity 26, and the third cavity 26 is filled with a liquid crystal layer 27. The first substrate 23 comprises a base substrate and a thin film transistor layer disposed on the base substrate. The thickness of the base substrate and the thickness of the encapsulation cover 11 are equal. It is understood that in the touch panel 1 using the box structure, the thickness of the encapsulation cover 11 can be substantially less than the thickness of the existing protective cover with a thickness of at least greater than 3.0 mm, and the encapsulation cover 11 can be made a glass substrate having the same material and the same thickness as the touch substrate. The encapsulation cover 11 may also be a glass substrate with the same material and thickness as the base substrate. Specifically, the encapsulation cover 11 may be a glass substrate having a thickness of 0.4 mm. Obviously, as mentioned above, this kind of glass substrate material is more common in the application of the substrates on both sides of the display panel 2, which makes it easier to be obtained for the production of the touch panel 1, and realizes mass production at a lower cost.

Figure 3:
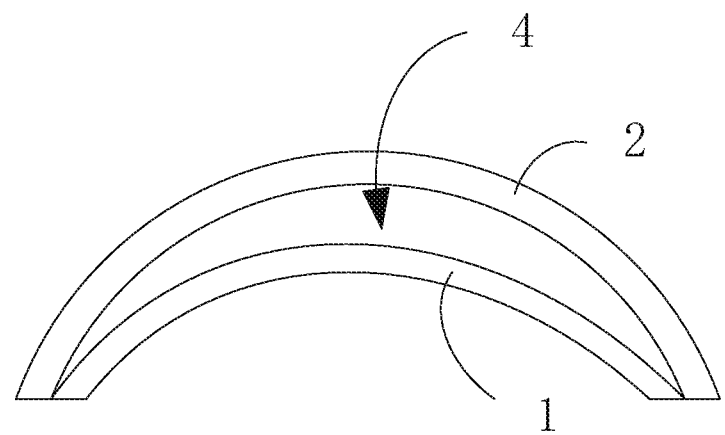
FIG. 3 is a first structural schematic diagram of the touch display device in an embodiment of the present application.

In one embodiment, as shown in FIG. 3, the display panel 2 is bent to form an arc-shaped curved surface structure, and the touch panel 1 is disposed on a concave side of the arc-shaped display panel 2 and conforms with the shape of the touch panel 1. It is understood that after the display panel 2 and the touch panel 1 are combined by a vacuum frame-lamination, and then undergo a bending step, the display panel 2 and the touch panel 1 as a whole can be bent to one side to form a curved screen.

Figure 4:
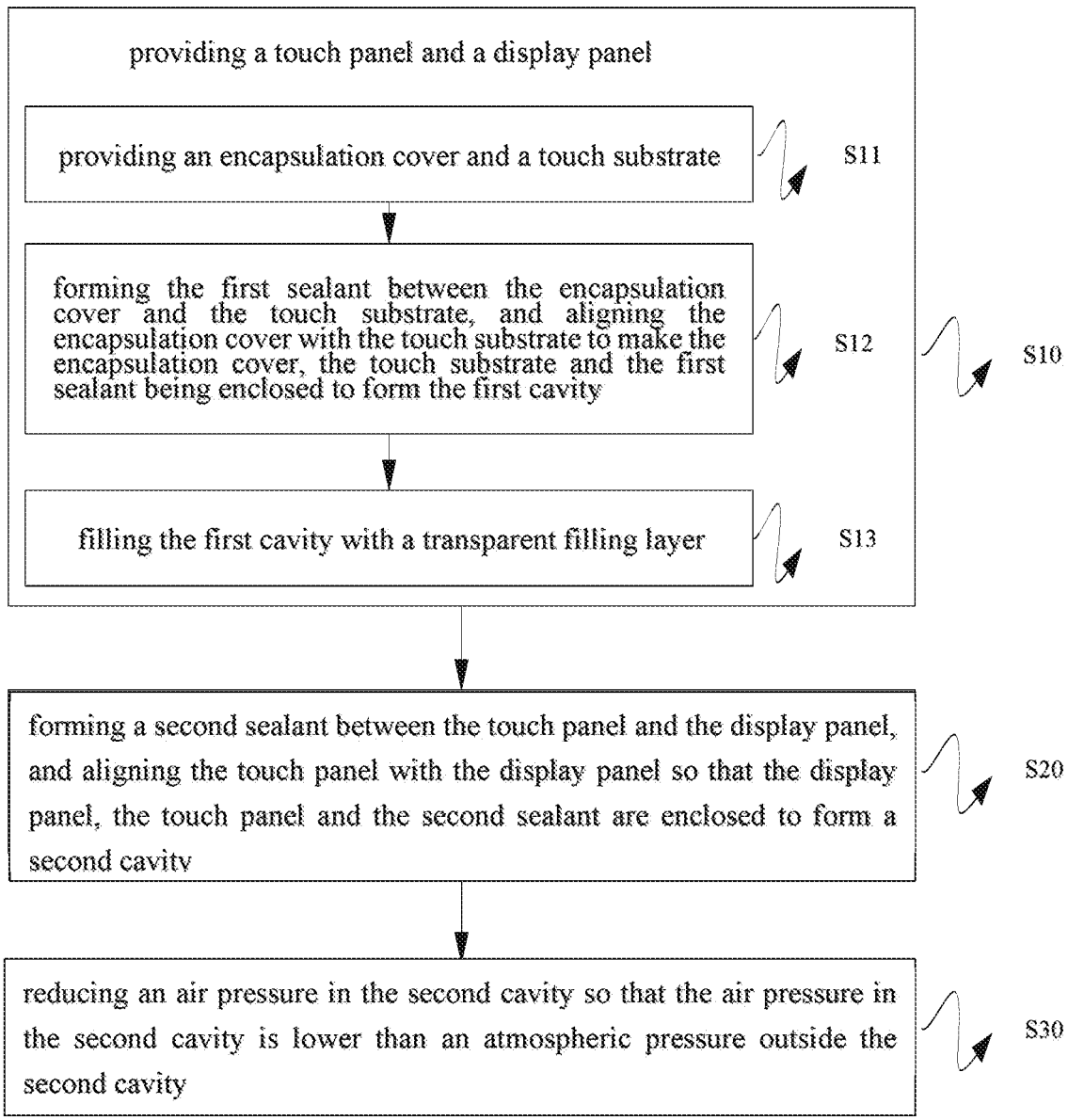
FIG. 4 is a schematic flowchart of a first fabrication method in an embodiment of the present application.

The present application also provides a fabrication method of a touch display device, as shown in FIG. 4, comprising following steps:

Step S10: providing a touch panel 1 and a display panel 2;

Step S20: forming a second sealant 3 between the touch panel 1 and the display panel 2, and aligning the touch panel 1 with the display panel 2 so that the display panel 2, the touch panel 1 and the second sealant 3 are enclosed to form a second cavity 4; and Step S30: reducing an air pressure in the second cavity 4 so that the air pressure in the second cavity 4 is lower than an atmospheric pressure outside the second cavity 4.

Herein, in the step S10, providing the touch panel 1 comprises:

Step S11: providing an encapsulation cover 11 and a touch substrate 12;

Step S12: forming the first sealant 13 between the encapsulation cover 11 and the touch substrate 12, and aligning the encapsulation cover 11 with the touch substrate 12 to make the encapsulation cover 11, the touch substrate 12, and the first sealant 13 being enclosed to form the first cavity 14; and Step S13: filling the first cavity 14 with a transparent filling layer 15.

It is understood that the touch panel 1 and the display panel 2 are both in a box structure, and a material of the transparent filling layer 15 filled in the first cavity 14 of the touch panel 1 may be liquid crystals. Specifically, different from the liquid crystal layer 27 in the display panel 2, the liquid crystals in the transparent filling layer 15 are unaligned liquid crystals. In addition, the encapsulation cover 11 and the touch substrate 12 also use a more mature box-forming process, and the encapsulation cover 11 in the touch panel 1 can also use a glass substrate that is commonly used in the display panel 2, which makes it more convenient for mass production of the touch display device.

Figure 5:
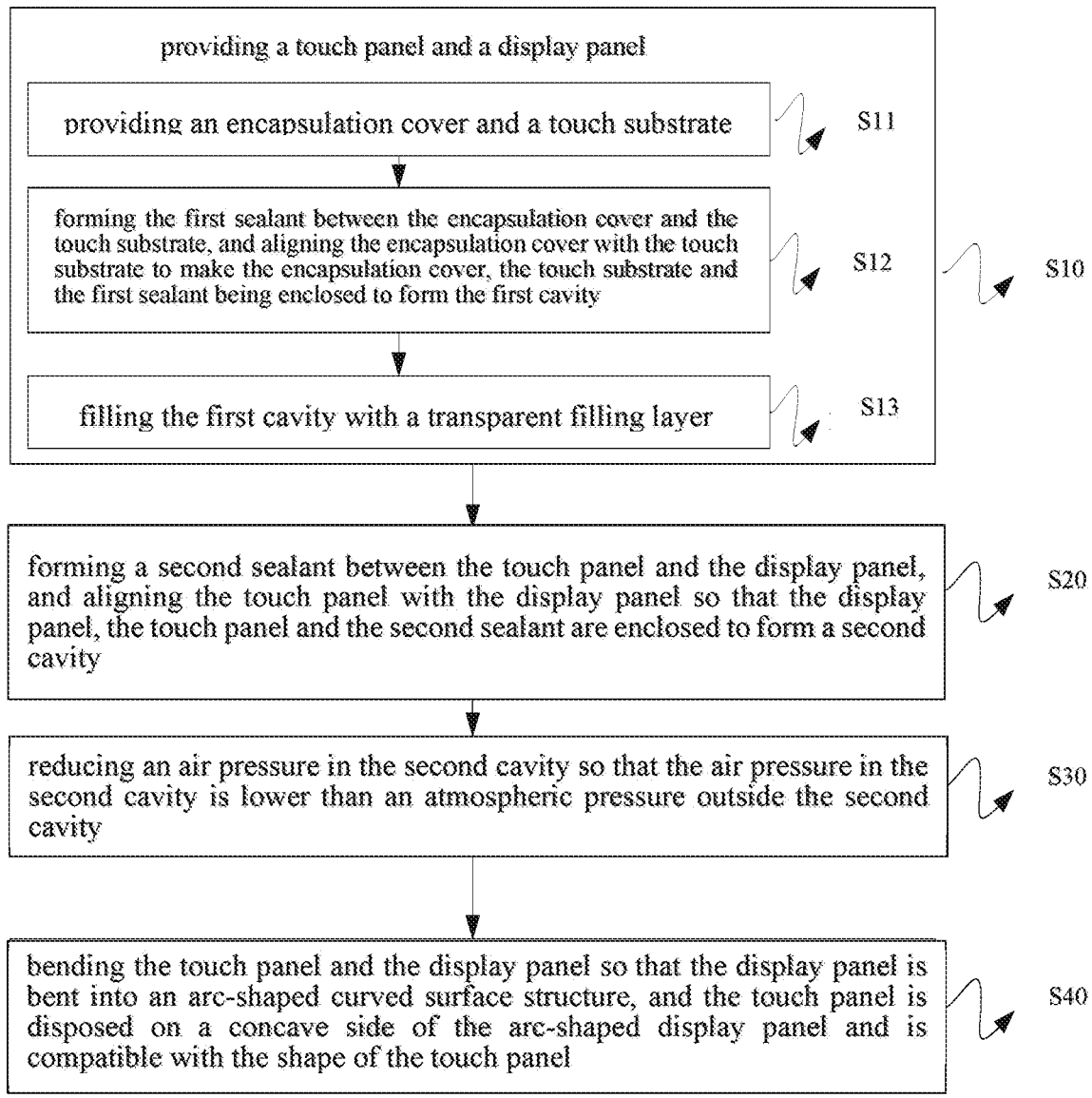
FIG. 5 is a schematic flowchart of a second fabrication method in an embodiment of the present application.

In the fabrication method of the touch display device provided in the present application, as shown in FIG. 5, the fabrication method further comprises:

Step S40: bending the touch panel 1 and the display panel 2 so that the display panel 2 is bent into an arc-shaped curved surface structure, and the touch panel 1 is disposed on a concave side of the arc-shaped display panel 2 and is compatible with the shape of the touch panel 1. It is understood that after the touch panel 1 and the display panel 2 are composed by the vacuum frame-lamination, a bending step is further included. During the bending process, due to the box structure of the touch panel 1 that reduces the thickness of the touch panel 1, problems of the original bending structure using the entire surface optical glue that restricts bending can be prevented, thereby facilitating the bending of the touch display device to form a curved touch display screen.

Accordingly, in the present application, the encapsulation cover 11 is aligned with the touch substrate 12, and the encapsulation cover 11 and the touch substrate 12 are adhered together through the first sealant 13, and the first cavity 14 enclosed by the encapsulation cover board 11, the touch substrate 12, and the first sealant 13 is filled with the transparent filling layer 15, so that the touch panel 1 has a boxed structure similar to the display panel 2, thereby solving the problem of limited bending of the touch panel 1 due to the use of an entire surface optical adhesive bonding structure. At the same time, the touch panel 1 with the box structure can also greatly reduce the thickness of the touch panel 1, preventing the display panel 2 from being excessively bent and deformed in the direction of the touch substrate 12 when performing the vacuum frame-lamination.

The descriptions of the above embodiments are only used to help understand the technology of the present application, solutions and their core ideas; those of ordinary skill in the art should understand that they can still modify the technical solutions described in the foregoing embodiments or equivalently replace some of the technical features, and these modifications or replacements do not make the essence of the corresponding technical solutions deviate from the scope of the technical solutions of the embodiments of the present application.

What is claimed is:

1. A touch panel, comprising:
   an encapsulation cover and a touch substrate disposed oppositely;
   a first sealant disposed between the encapsulation cover and the touch substrate, wherein the encapsulation cover, the touch substrate and the first sealant are enclosed to form a first cavity, and the first cavity is filled with a transparent filling layer; and
   a black dam disposed on a side of the encapsulation cover close to the touch substrate, and an orthographic projection of the black dam on the touch substrate covers an orthographic projection of the first sealant on the touch substrate.

2. The touch panel of claim 1, wherein a material of the transparent filling layer is liquid crystals.

3. A touch display device, comprising:
   a display panel and the touch panel according to claim 1; and
   a second sealant disposed between the display panel and the touch panel, wherein the display panel, the touch panel, and the second sealant are enclosed to form a second cavity, and an air pressure in the second cavity is lower than an atmospheric pressure outside the second cavity.

4. The touch display device of claim 3, wherein the display panel comprises a display area and a non-display area surrounding the display area, and the black dam is located in the non-display area.

5. The touch display device of claim 3, wherein a thickness of the touch panel is equal to a thickness of the display panel.

6. The touch display device of claim 3, wherein:
the display panel comprises a first substrate and a second substrate disposed opposite to each other, and a third sealant is disposed between the first substrate and the second substrate;
the first substrate, the second substrate and the third sealant are enclosed to form a third cavity, and the third cavity is filled with a liquid crystal layer; and
the first substrate comprises a base substrate and a thin film transistor layer on the base substrate, and a thickness of the base substrate is equal to a thickness of the encapsulation cover.

7. The touch display device of claim 3, wherein the display panel is curved to form an arc-shaped curved surface structure, and the touch panel is disposed on a concave side of the arc-shaped display panel and conforms with the shape of the touch panel.

8. A fabrication method of a touch display device, comprising following steps:
providing a touch panel and a display panel, wherein providing the touch panel comprises:
providing an encapsulation cover and a touch substrate; and
forming a first sealant between the encapsulation cover and the touch substrate,
wherein the encapsulation cover and the touch substrate are aligned so that the encapsulation cover, the touch substrate and the first sealant are enclosed form a first cavity, and the first cavity is filled with a transparent filling layer;
forming a second sealant between the touch panel and the display panel, wherein the touch panel and the display panel are aligned so that the display panel, the touch panel, and the second sealant are enclosed to form a second cavity; and
reducing an air pressure in the second cavity so that the air pressure in the second cavity is lower than an atmospheric pressure outside the second cavity.

9. The fabrication method of the touch display device according to claim 8, further comprising:
bending the touch panel and the display panel so that the display panel is bent into an arc-shaped curved surface structure, and the touch panel is disposed on a concave side of the arc-shaped display panel and conforms with the shape of the touch panel. an array substrate;
a light-emitting device layer disposed on the array substrate; and
an encapsulation layer disposed on the light-emitting device layer, wherein the light-emitting device layer comprises a pixel definition layer disposed on the array substrate, and
wherein the pixel definition layer comprises a plurality of grooves formed along a periphery of a sub-pixel area of the display panel, and at least one of the grooves corresponds to the sub-pixel area.

\* \* \* \* \*

UNITED STATES PATENT AND TRADEMARK OFFICE
CERTIFICATE OF CORRECTION

| | |
|---|---|
| PATENT NO. | : 11,494,014 B2 |
| APPLICATION NO. | : 17/051478 |
| DATED | : November 8, 2022 |
| INVENTOR(S) | : Chingyuan Cheng |

It is certified that error appears in the above-identified patent and that said Letters Patent is hereby corrected as shown below:

On the Title Page

Applicant (71):
Change - "HUIZHOU CHINA STAR OPTOELECTRONICS TECHNOLOGY CO.,"
To - "HUIZHOU CHINA STAR OPTOELECTRONICS TECHNOLOGY CO., LTD."

Signed and Sealed this
Thirtieth Day of May, 2023

Katherine Kelly Vidal
*Director of the United States Patent and Trademark Office*